United States Patent [19]
Kagawa et al.

[11] Patent Number: 5,802,869
[45] Date of Patent: Sep. 8, 1998

[54] ABSORPTION REFRIGERATOR

[75] Inventors: Manabu Kagawa; Mitsuru Ishikawa, both of Saitama, Japan

[73] Assignee: Honda Giken Kogyo Kabushiki Kaisha, Tokyo, Japan

[21] Appl. No.: 834,732

[22] Filed: Apr. 3, 1997

[30] Foreign Application Priority Data

Apr. 5, 1996 [JP] Japan ................................ 8-110388

[51] Int. Cl.⁶ ............................................ F25B 15/00
[52] U.S. Cl. ................................. 62/476; 417/313
[58] Field of Search ......................... 62/476, 483, 101; 417/313

[56] References Cited

U.S. PATENT DOCUMENTS

| | | | |
|---|---|---|---|
| 3,132,493 | 5/1964 | Peckham et al. | 62/483 |
| 3,195,318 | 7/1965 | Miner | 62/483 |
| 4,739,862 | 4/1988 | Mullis | 184/6.22 |
| 5,016,448 | 5/1991 | Plzak | 62/476 |
| 5,253,523 | 10/1993 | Bernardin | 62/476 |

*Primary Examiner*—William Doerrler
*Attorney, Agent, or Firm*—Nikaido, Marmelstein, Murray & Oram LLP

[57] ABSTRACT

Pipings for joining pumps for delivering absorbent solution and refrigerant with an absorber and an evaporator are eliminated for minimizing the dimensions of the absorber or the evaporator, preventing leakage under pressure, and reducing heat loss and cavitation. Two pumps P2 and P3 for circulating and delivering the absorbent solution in a lower tank 21 are mounted in side-by-side relationship in a recess of a base 23 of the lower tank 21. The base 23 has a space therein for accommodating an impeller 36. The space forms a part of pump chamber communicated to a flow passage 37.

8 Claims, 5 Drawing Sheets

ABSORPTION REFRIGERATOR

BACKGROUND OF THE INVENTION

1. Field of the Invention

The present invention relates to an absorption refrigerator and particularly, an improved absorption refrigerator which is arranged for prevention of cavitation and pressure leakage or loss about a pump connected to an absorber or an evaporator, and minimized in the overall size.

2. Description of the Related Art

An absorption refrigerator has an evaporator and an absorber which are held at low pressure and connected to each other so that refrigerant vapor generated in the evaporator is absorbed by an absorbent solution in the absorber for performing the absorption cycle refrigeration. In the evaporator, an unevaporated form of the refrigerant is circulated to cool down chilled water tubes where chilled water is delivered to e.g. a cooler cabinet set in the room.

The absorbent in the absorber is increased in the temperature upon absorption of the refrigerant vapor and lowered in concentration, thus lowering its absorbing capability. The absorbent is circulated in the absorber and exposed to a cooling water tube for refrigerating the cooling water. After heat has been transferred from the absorbent to a cooling water in the cooling water tube, the cooling water is circulated to a heat exchanger where its heat is released. The absorbent liquid at a lower concentration is fed to a regenerator for restoring a high concentration of the absorbent.

The circulations of unevaporated refrigerant in the evaporator and of absorbent in the absorber and the transportation of the absorbent to the regenerator are conducted by pumps. A conventional system including such pumps is shown in FIG. 5. As shown, an absorber 100 comprises a heat exchanger 101 and a reservoir 102 for storage of an absorbent. A pump 103 is provided for delivering the absorbent from the reservoir 102 to a regenerator (not shown). For ease of the system arrangement, the pump 103 is connected by an elbow pipe 104 to the reservoir 102. In practice, the elbow 104 is joined by fittings 105 and 106 respectively to the reservoir 102 and the pump 103. The output of the pump 103 is coupled by a fitting 107 to a delivery tube 108. The pump 103 is fixedly mounted to a base plate 109 while the elbow 104 is secured by a clamp 110. The base plate 109 and the clamp 110 may be anchored to a proper support 112.

The conventional system mentioned above however has following disadvantages. The evaporator and absorber in the system are maintained at as a low pressure as 30 mmHg for operation. Since the absorbent and unevaporated refrigerant circulated by the pumps are nearly saturated, they may develop cavitation due to pressure loss in the tube between the reservoir 102 and the pump 103, hence causing idling actions of the pump 103. It is known that such cavitation is prevented by increasing the inner diameter of the tube and thus reducing the pressure loss. While the pressure is being decreased to as a low level as a vacuum in the tube, increase of the diameter of the tube may result in leakage under pressure at the fittings. In addition, installation of a suction head is needed thus increasing the overall height.

This will require a larger space for installation of the pumps with extra pipings and fittings and also, causes the pump and its pipings to be installed with less freedom of the layout design in relation to the location of other components in the system. It is therefore essential to use such an elbow as shown in FIG. 5 which tends to generate cavitation due to the pressure loss will hardly be avoided.

SUMMARY OF THE INVENTION

It is an object of the present invention to provide an absorption refrigerator which is adapted for preventing leakage under pressure and cavitation about a pump connected to an absorber or evaporator, and also minimized in the overall size.

According to a first feature of the present invention, an absorption refrigerator is provided comprising: an evaporator provided with a refrigerant tank for storing a refrigerant; an absorber provided with an absorbent solution tank for storing a solution of an absorbent and arranged for allowing the absorbent solution to absorb a refrigerant vapor generated in the evaporator; a regenerator for heating the absorbent solution drawn from the absorber to release the refrigerant vapor; a condenser for condensing the refrigerant vapor released in the regenerator for supplying to the evaporator; and a pump for delivering the absorbent solution from the absorbent solution tank. In particular, the pump has a housing thereof joined to a wall of the absorbent solution tank so that the pump and the absorbent solution tank are formed integral with each other.

According to a second feature of the present invention, the pump comprises a circulation pump for circulating the absorbent solution within the absorber and a delivery pump for delivering the absorbent solution to the regenerator, and the circulation pump and the delivery pump are mounted in side-by-side relationship to the wall of the absorbent solution tank. A third feature of the present invention provides a pump for delivering the refrigerant from the refrigerant tank and has a housing thereof joined to a wall of the absorbent solution tank so that the pump and the refrigerant tank are formed integral with each other.

According to a fourth embodiment of the present invention, the pump comprises a swirl pump provided with an impeller and the wall of the absorbent solution tank has a recess formed therein for defining a pump chamber together with the absorbent solution tank in which the impeller of the swirl pump is accommodated.

A fifth feature of the present invention provides two swirl pumps for delivering the absorbent solution from the absorbent solution tank and for delivering the refrigerant from the refrigerant tank. In particular, a wall of the absorbent solution tank has a recess formed therein for defining a pump chamber together with the absorbent solution tank in which the impeller of the swirl pump for pumping the absorbent solution is accommodated, and a wall of the refrigerant tank has a recess formed therein for defining a pump chamber together with the refrigerant tank in which the impeller of the swirl pump for pumping the refrigerant is accommodated.

According to the first to fifth features of the present invention, the pumps for delivering the refrigerant and the absorbent solution from the refrigerant tank and the absorbent solution tank respectively are formed integral with their respective tanks thus eliminating the need of extra pipings for joining the pumps to their respective tanks. Accordingly, leakage under pressure at the joint between the pump and the tank will be minimized and heat loss at the same will be eliminated. The fourth and fifth features permit the pumps to be partially embedded in the walls of the tanks hence reducing unwanted projections from the absorber and the evaporator.

DETAILED DESCRIPTION OF THE PREFERRED EMBODIMENT

Figure 4:
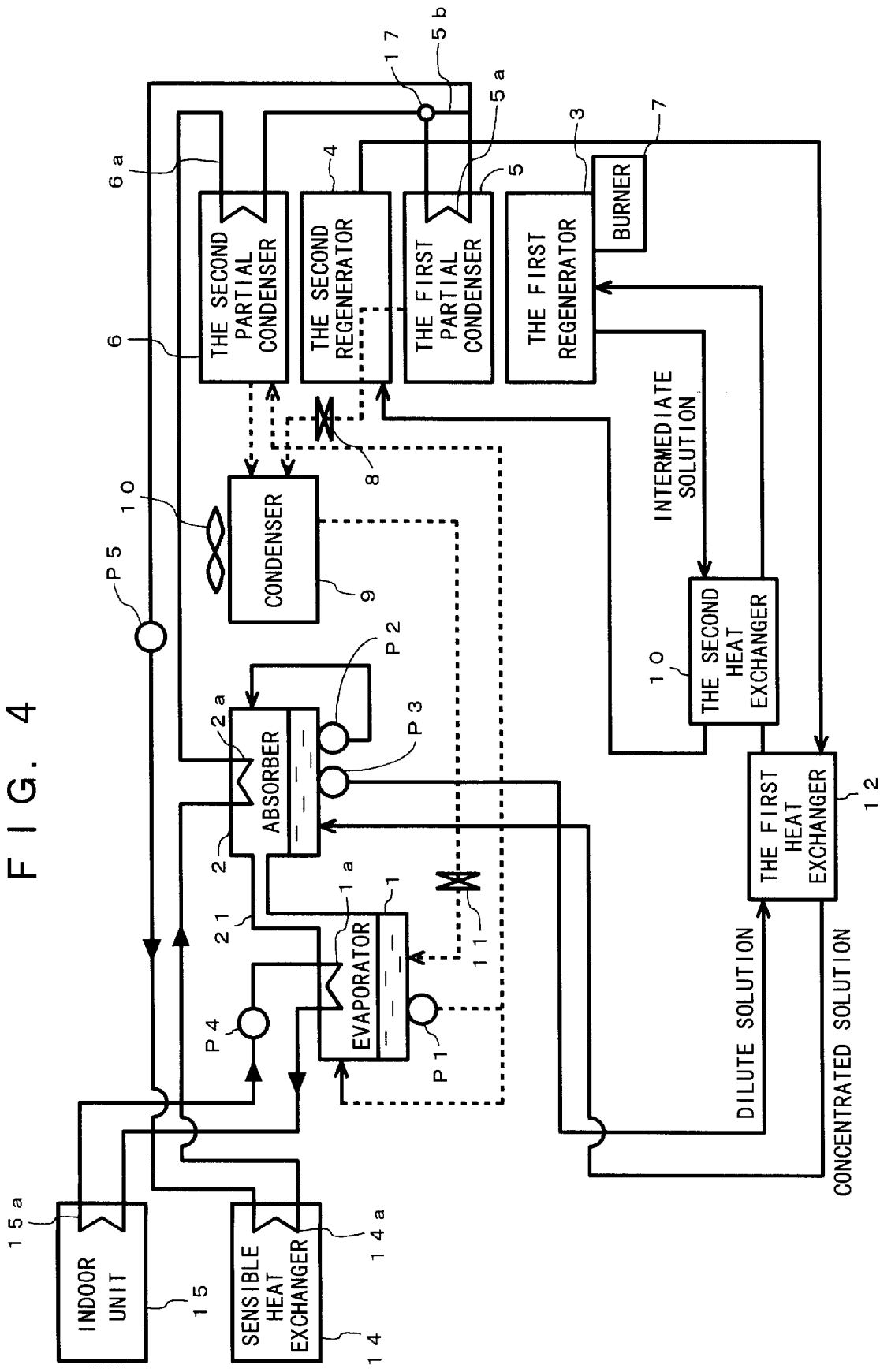
FIG. 4 is a piping diagram of the refrigerator of the embodiment showing a cooling operation.
Figure 5:
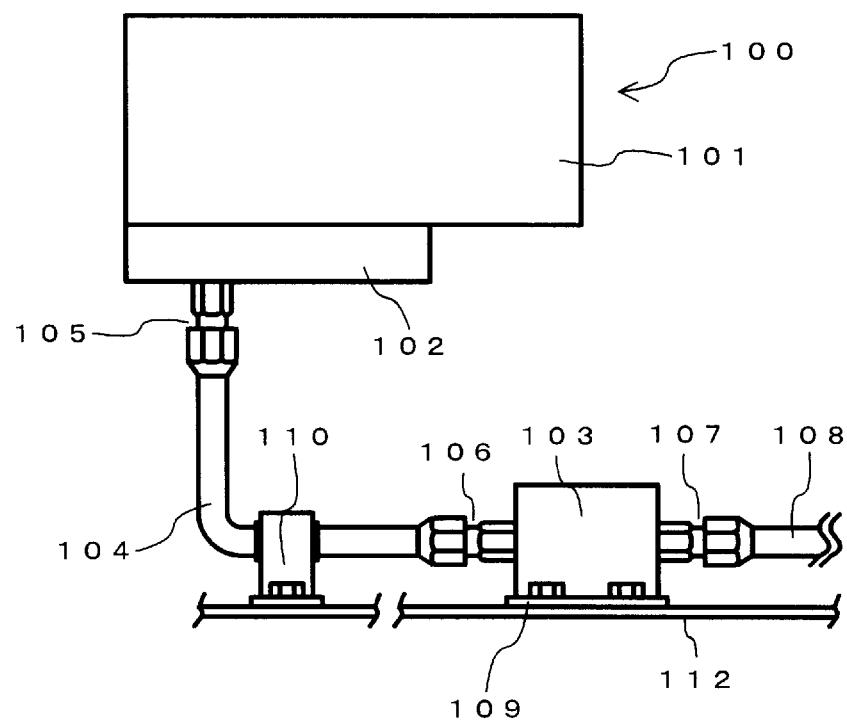
FIG. 5 is a view showing an absorber, a pump, and piping therebetween in a conventional refrigerator system.

The present invention will be described in more detail referring to the accompanying drawings. FIG. 4 is a block diagram showing a primary part of an absorption refrigerator of an embodiment according to the present invention. An evaporator 1 contains a refrigerant of fluoride alcohol and an absorber 2 contains an absorbent solution of DMI (1,3-dimethyl-2-imidazolidinone) derivative. The evaporator 1 and the absorber 2 are fluidly connected to each other by a vapor passage 21 so that a refrigerant vapor of fluoride alcohol evaporated in the evaporator 1 is absorbed by the absorbent solution in the absorber 2 for absorption refrigeration. For accelerating the evaporation of the refrigerant, both the evaporator 1 and the absorber 2 are maintained at as a low pressure as 30 mmHg.

When the absorbent solution in the absorber 2 is risen in the temperature upon absorbing the refrigerant vapor, it is cooled down for promoting the absorbing action by a cooling water circulated in a tube 2a through a sensible heat exchanger 14. This accelerates the evaporation of the refrigerant in the evaporator 1 which is thus refrigerated by the effect of latent heat of the refrigerant. A tube 1a extends across the evaporator 1 for running a chilled liquid such as a solution of ethylene glycol or propylene glycol. The refrigerant is delivered by a pump P1 to a spraying means (not shown) in the evaporator 1 and sprayed over the tube 1a in which the chilled liquid runs. The refrigerant withdraws heat from the chilled liquid in the tube 1a and turns to a low-pressure vapor which is then drawn to the absorber 2 via the vapor passage 21. A portion of the refrigerant is delivered to a second partial condenser while the majority is pumped to the spraying means.

For suppressing the rise of the temperature of the absorbent solution, the cooling water is circulated in the tube 2a in the absorber 2. The absorbent solution is drawn by a pump P2 into a spraying means (not shown) in the absorber 2 and sprayed over the tube 2a. This allows the cooling water in the tube 2a to cool down the absorbent solution.

Upon absorbing the refrigerant vapor the absorbent solution in the absorber 2 is lowered in the concentration of its absorbent hence decreasing the capability of absorption. For generating the refrigerant vapor and reviving the absorption capability of the absorbent solution, a regenerator is provided. In this embodiment, the regenerator consists of a first (high-temperature) regenerator 3 and a second (low-temperature) regenerator 4. The first regenerator 3 is coupled to a first (high-temperature) partial condenser 5 and the second regenerator 4 to the second (low temperature) partial condenser 6; they produce in combination a double effect regenerator.

The first regenerator 3 includes a burner 7 for boiling a diluted solution drawn by a pump P3 from the absorber 2. A resultant refrigerant vapor distilled from the diluted solution is then delivered to the first partial condenser 5 where it is cooled down by a cooling water supplied through a tube 5a in the first partial condenser 5 thus to release the absorbent included in the vapor. As the result, the diluted solution is turned to an intermediate solution which is increased in the concentration of the absorbent and saved in the bottom of the first regenerator 3.

The refrigerant vapor from the first partial condenser 5 remains still at a high temperature and is fed to the second regenerator 4 for heating the intermediate solution. The intermediate solution is drawn to the second generator 4 and heated by heat of the refrigerant vapor from the first partial condenser 5 thus releasing a refrigerant vapor. The refrigerant vapor is fed to the second partial condenser 6 where it is cooled down by a cooling water circulating through a tube 6a in the second partial condenser 6. Accordingly, an absorbent is released from the refrigerant vapor by the same action as of the first partial condenser 5. The absorbent solution is thus increased in the concentration of the absorbent as saved in the bottom of the second regenerator 4 before circulated again to the absorber 2.

The refrigerant vapor from the second partial condenser 6 is fed to a condenser 9. Also, the refrigerant vapor from the second regenerator 4 is reduced in pressure by a pressure-reducing valve 8 and then drawn to the condenser 9. The refrigerant vapor fed to the condenser 9 has been purified to about 99.8% of purity. The condenser 9 with a cooling fan cools down and condenses the refrigerant vapor to a liquid which is then circulated to the evaporator 1 via a pressure-reducing valve 11.

The refrigerant fed back to the evaporator 1 is of high purity, but still contains a trace of the absorbent which is accumulated during long-term operating cycles hence gradually degrading the purity of the refrigerant. For preventing such degrading of the refrigerant purity, a little portion of the refrigerant is delivered from the evaporator 1 to the second partial condenser 6 where it is mixed with the vapor from the intermediate solution and joined to the purifying cycle in the regenerator and partial condenser.

A first heat exchanger 12 is connected between the absorber 2 and the first regenerator 3 for allowing a high-temperature concentrated solution from the second regenerator 4 to be cooled down through heat exchange with the dilute solution from the absorber 2 and circulated to the absorber 2. The dilute solution preliminarily heated in the first heat exchanger 12 is fed to a second heat exchanger 13 where it is subjected to heat exchange with the high-temperature intermediate solution from the first regenerator 3 for being pre-heated again before drawn to the first regenerator 3. Meanwhile, the intermediate solution is cooled down and circulated to the second regenerator 4.

The sensible heat exchanger 14 includes a tube 14a for heat exchange between the cooling water and the atmosphere. An indoor unit 15 is provided with a tube 15a for running a chilled water cooled down by the unevaporated refrigerant in the evaporator 1. The indoor unit 15 has a fan (not shown) for blowing air on the chilled water tube 15a so that cooled air is blow out to interior of room, whereby the absorption refrigerator acts as a cooler machine. When the cooling water circulating the tube 2a of the absorber 2 and in both tubes 5a and 6a of their respective first and second partial condensers 5 and 6 is introduced into the tube 15a of the indoor unit 15 by the action of a switching means (not shown) while the chilled water from the evaporator 1 is pumped to the tube 14a of the sensible heat exchanger 14, the indoor unit 15 will serve as a heat radiator. The switching means for switching between a cooling mode and a heating mode may be a known four-directional valve. The circulation of the chilled and cooling waters is driven by pumps P4 and P5, respectively.

Figure 1:
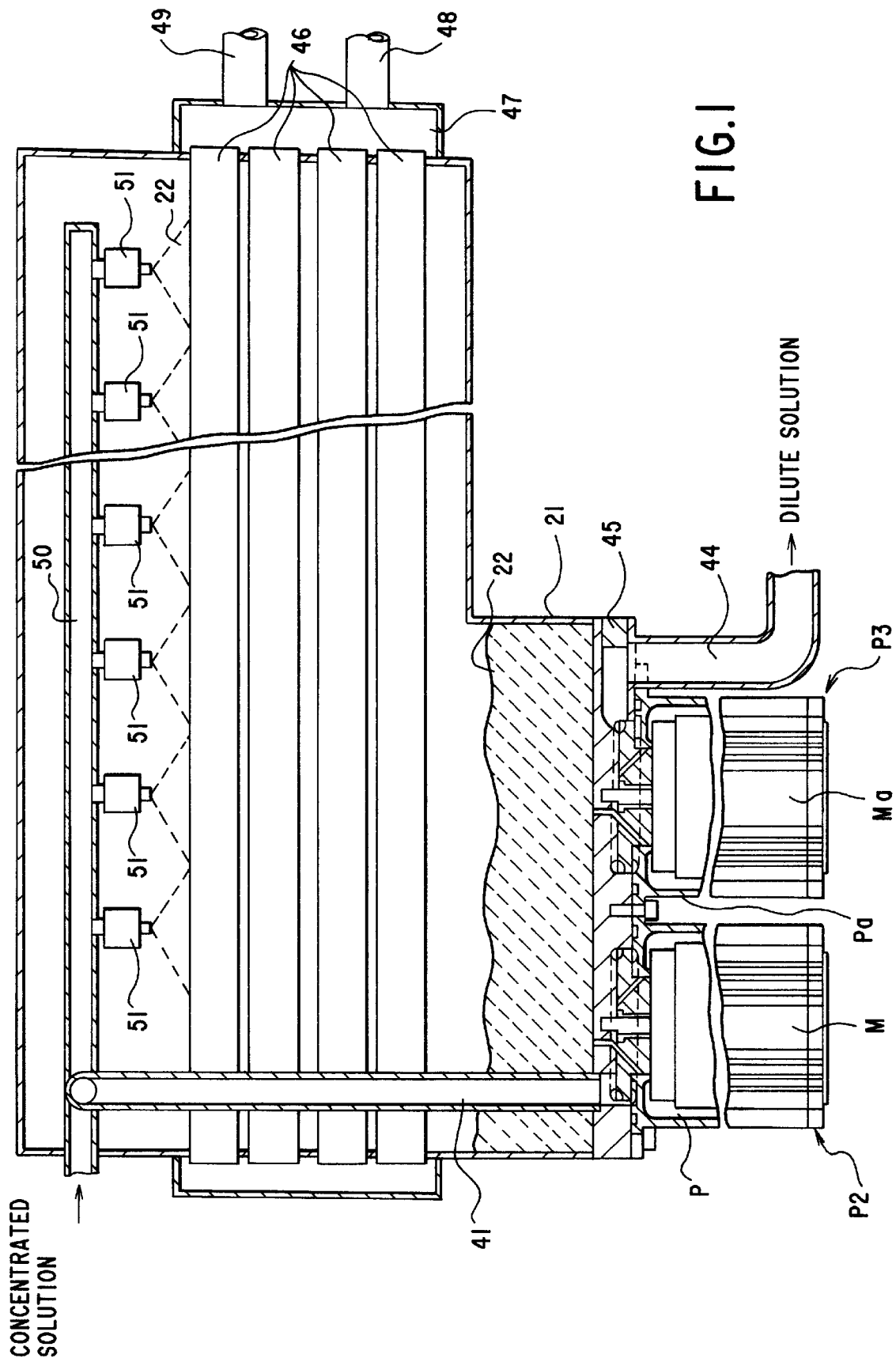
FIG. 1 is a front cross sectional view of an absorber in a refrigerator according to an embodiment of the present invention.
Figure 2:
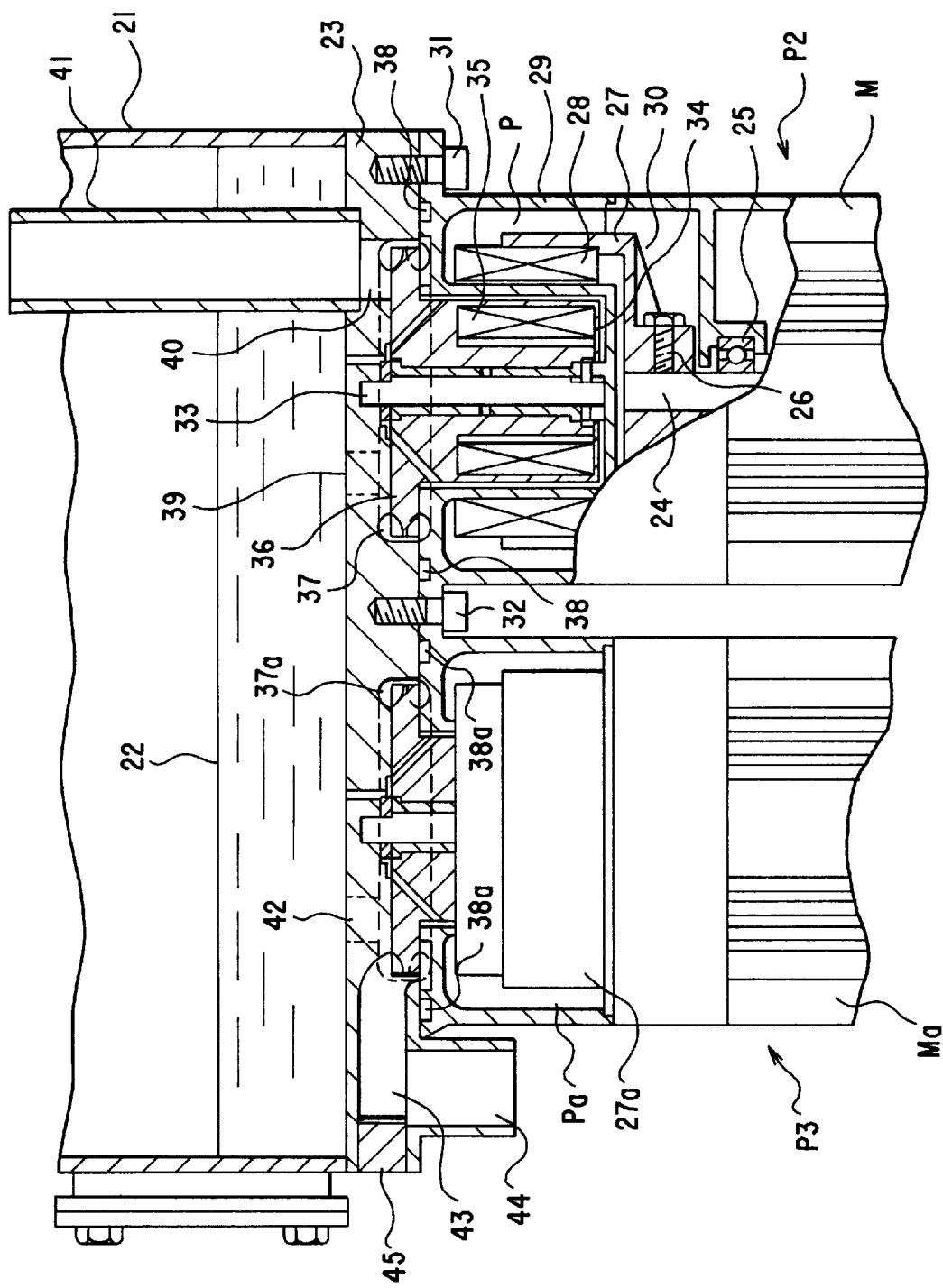
FIG. 2 is an enlarged cross sectional view of a lower tank of the absorber in the refrigerator of the embodiment.

The joint between the evaporator 1 and the pump P1 and the joint between the absorber 2 and the pumps P2 and P3 will now be explained in detail. The joint between the absorber 2 and the pumps P2 and P3 is shown in FIG. 1 which is a front cross sectional view of the absorber 2. FIG. 2 is an enlarged cross sectional view of a lower tank assembly of the same. Referring to FIG. 2, a lower tank 21 is provided in a lower region of the absorber 2 for storing a certain volume of the absorbent solution 22. The lower tank 21 is supported by a support plate or base 23 to which the pumps P2 and P3 are mounted in side-by-side relationship. As described previously, the pump P2 is adapted for feeding the absorbent solution 22 to an upper end of the absorber 2 to accelerate the absorption of the refrigerant and the pump P3 is for delivering the absorbent solution 22 to the first regenerator 3 to recover the concentration.

The pumps P2 and P3 are arranged in swirl pump construction incorporating cascade pumps which are rather resistive to the generation of cavitation. The pumps P2 and P3 comprise motor sections M and Ma and pump sections P and Pa, respectively. The pump construction will be explained in more detail referring to the pump P2. The motor section M of the pump P2 includes a shaft 24 rotatably supported by a bearing 25 and driven by a driving means (not shown). A rotor 27 is fixedly mounted by a bolt 26 to the shaft 24. A plurality of magnets 28 are mounted to a center or inner side of the rotor 27.

The bearing 25 is joined with its outer race to a housing 29. The housing 29 has an inner cylinder 30 thereof arranged coaxially with the shaft 24 of the motor section M and is anchored by bolts 31 and 32 to the base 23. A pump shaft 33 extends across the inner cylinder 30 as is joined at one end to the inner cylinder 30 and at the other end to the base 23. A pump rotor 34 is mounted to the pump shaft 33 for rotation about the shaft 33. A plurality of magnets 35 are located at equal intervals on the circumferential end of the pump rotor 34. Accordingly, when the rotor 27 of the motor section M rotates, its magnets 28 attract the magnets 35 on the pump rotor 34 which thus follows the rotation of the rotor 27 of the motor section M.

The pump rotor 34 has an impeller 36 formed at one end (the upper end in this embodiment) thereof for rotation in a flow passage 37 of the base 23. More specifically, the base 23 has a recess provided in the lower side thereof for accepting the impeller 36 and thus serving as a pump chamber or casing. As the impeller 36 is located in the recess of the base 23, the size of the extending portion of the pump P2 is reduced. A seal material 38 is mounted between the housing 29 and the base 23 for producing air-tightness.

The flow passage 37 in the base 23 is communicated to an inlet 39 for inspiring the absorbent solution 22 from the lower tank 21 and an outlet 40 for discharging the absorbent solution 22. Preferably, the inlet 39 and the outlet 40 are arranged so that the distance between them is a maximum. The outlet 40 of the base 23 is connected to one end of an outlet tube 41 which upwardly extends.

The pump P3 is identical in the construction to the pump P2 like components thereof are denoted like numerals accompanied by a lower case "a". In the pump P3, an outlet 43 communicated to a flow passage 37a for delivering the absorbent solution 22 inspired through an inlet 42 to the regenerator is connected to one end of a conduit 44. As shown, an opening provided for drilling the outlet 43 is closed with a plug 45.

The structure of the absorber 2 will be described referring to FIG. 1. A group of cooling water pipes 46 (which correspond to the tube 2a) are mounted in an upper region of the absorber 2, i.e. above the lower tank 21. Accordingly, the cooling water fed from an inlet 48 of a jacket 47 passes through the pipes 46 and flows out from an outlet 49.

In operation, the absorbent solution 22 is drawn up to a spray tube 50 via a conduit 41 and sprayed through spraying nozzles 51 attached to the spray tube 50 over the cooling water pipes 46. This allows the absorbent solution 22 to be cooled down by the cooling water in the cooling water pipes 46 when being dropped, and recovered in the lower tank 21. As described, the cooling water having raised its temperature is circulated to the sensible heat exchanger 14 in the cooling mode operation, while to the indoor unit 15 in the heating mode operation via the partial condenser 5, and 6. The concentrated solution reclaimed by the regenerators 3 and 4 is also introduced to the spray tube 50 and sprayed over the cooling water pipes 46.

Figure 3:
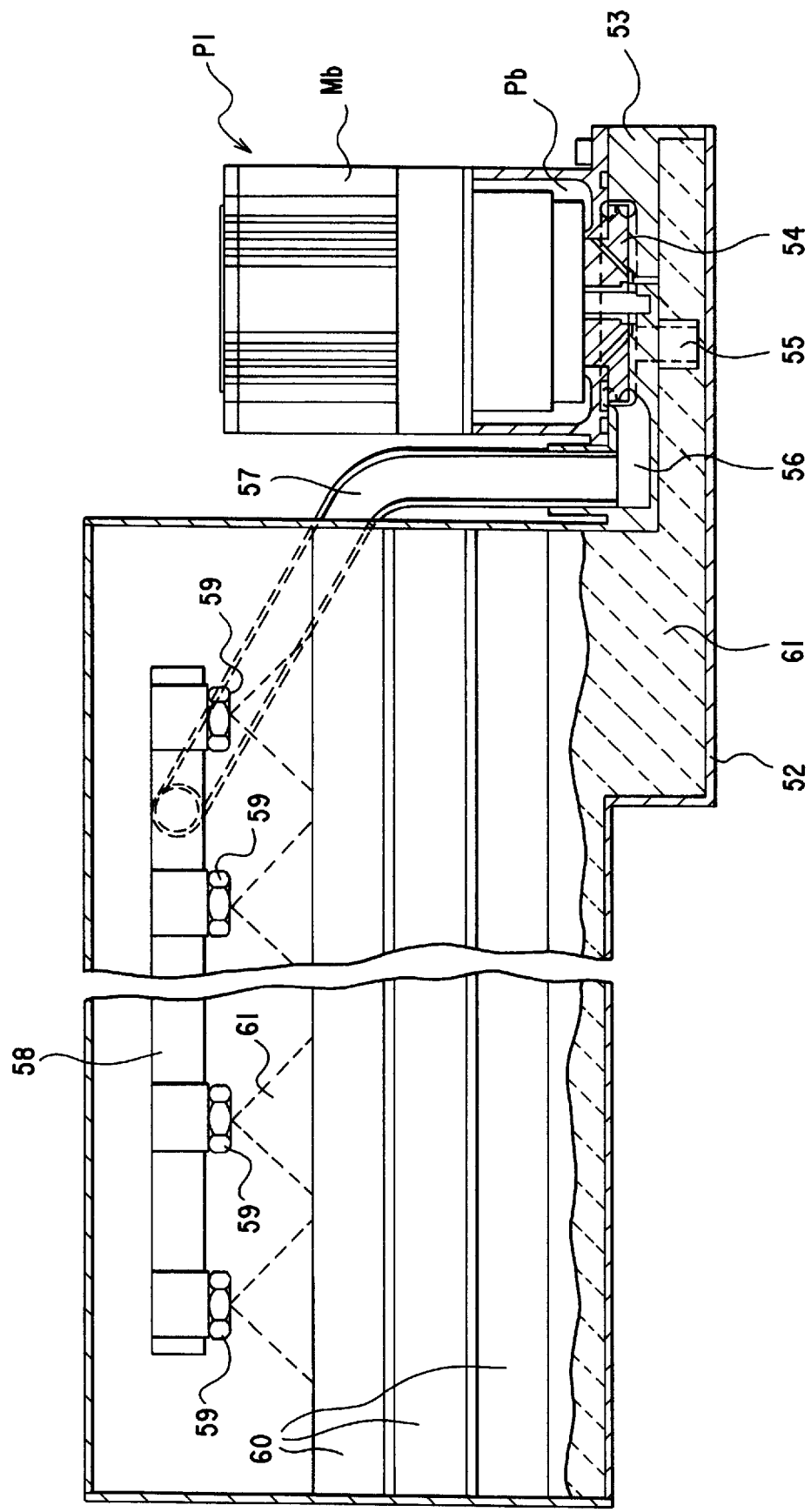
FIG. 3 is a front cross sectional view of an evaporator in the refrigerator of the embodiment.

The structure of the evaporator 1 accompanied with the pump P1 will now be described referring to FIG. 3. The pump P1 is mounted to an upper plate 53 of a lower tank 52 of the evaporator 1 so that its motor section Mb is above its pump section Pb. The lower tank 52 contains a refrigerant 61. In the evaporator 1, an impeller 54 of the pump P1 is installed in a recess of an upper plate 53 in a same manner as in the absorber 2. Since the pump P1 is partially embedded as shown in FIG. 3, its exposed portion is minimized.

The upper plate 53 has an inlet 55 thereof projected into the lower tank 52 for pumping up the refrigerant 61. Also, the upper plate 53 is provided with an outlet 56 for discharging the refrigerant from the pump P1. The outlet 56 is communicated to an upwardly extending conduit 57.

The conduit 57 is bent at an intermediate region and connected to a spray tube 58. The spray tube 58 is horizontally mounted in the evaporator 1 and provided at the bottom with a plurality of spraying nozzles 59. A group of chilled water pipes 60 are located beneath the spraying nozzles 59. The chilled water pipes 60 correspond to above-mentioned tube 1a of the evaporator 1 and has an inlet and an outlet (not shown) for running the chilled water. The conduit 57 has a junction, not shown, for delivering a portion of the refrigerant in the evaporator 1 to the second partial condenser 6.

In operation, the refrigerant 61 is pumped up along the conduit 57 to the spray tube 58 and sprayed from the spraying nozzles 59 over the chilled water pipes 60. As the refrigerant 61 falls directly on the chilled water pipes 60, the temperature of the chilled water is dropped. The chilled water is circulated to the indoor unit 15 in the cooling mode operation, while to the sensible heat exchanger 14 in the heating mode operation, as mentioned above.

As set forth above, the present invention allows the pump for delivering a refrigerant or absorbent solution to be arranged integral with the tank for storing the refrigerant or absorbent solution. This eliminates the need of larger diameter pipes which is indispensable in the prior arts, for preventing cavitation between the pump and the tank. Accordingly, leakage under pressure, for example, at the joints between pipes will be minimized and heat loss, which is indispensable when the large pipes are used, will remarkably be reduced. Also, the pump is partially embedded in a wall of the tank and its inlet is so designed in size and location as to avoid unwanted cavitation. As a result the pump occupies a minimum installation space, the projection from the absorber or the evaporator is decreased, the freedom for determining a layout of installation of relevant components is increased and the overall dimensions of the absorption refrigerator are minimized.

When the pump is anchored on the wall of the tank, the wall of the tank has to be increased in rigidity. As forming a flow passage in the wall of the tank, the tank itself will be minimized in the size compared with the case that merely increasing the thickness of the wall, without decreasing the physical strength of the tank.

What is claimed is:

1. An absorption refrigerator comprising:

an evaporator provided with a refrigerant tank for storing a refrigerant;

an absorber fluidly communicated by a vapor passage to the evaporator and provided with an absorbent solution tank for storing a solution of an absorbent which absorbs a refrigerant vapor generated in the evaporator;

a regenerator for heating the absorbent solution drawn from the absorber to release the refrigerant vapor;

a condenser for condensing the refrigerant vapor released in the regenerator for supplying to the evaporator; and a pump for delivering the absorbent solution from the absorbent solution tank, wherein a housing of said pump joined to a recessed part of a wall of the absorbent solution tank to make a pump chamber so that the pump and the absorbent solution tank are formed integral with each other.

2. An absorption refrigerator according to claim 1, wherein the pump comprises a circulation pump for circulating the absorbent solution within the absorber and a delivery pump for delivering the absorbent solution to the regenerator, said circulation pump and said delivery pump mounted in side-by-side relationship to the wall of the absorbent solution tank.

3. An absorption refrigerator according to claim 1, wherein the pump comprises a swirl pump provided with an impeller and the impeller of the swirl pump is accommodated in the pump chamber.

4. An absorption refrigerator according to claim 3, wherein the swirl pump has a housing thereof in which the impeller is rotatably installed and a flow passage for running the absorbent solution in the pump chamber is defined by a portion of the housing and a wall of said recessed part in the wall of the absorbent solution tank.

5. An absorption refrigerator comprising:

an evaporator provided with a refrigerant tank for storing a refrigerant;

an absorber fluidly communicated by a vapor passage to the evaporator and provided with an absorbent solution tank for storing a solution of an absorbent which absorbs a refrigerant vapor generated in the evaporator;

a regenerator for heating the absorbent solution drawn from the absorber to release the refrigerant vapor;

a condenser for condensing the refrigerant vapor released in the regenerator for supplying to the evaporator; and a pump for delivering the refrigerant from the refrigerant tank, wherein a housing of said pump joined to a recessed part of a wall of the refrigerant tank to make a pump chamber so that the pump and the refrigerant tank are formed integral with each other.

6. An absorption refrigerator according to claim 5, wherein the pump comprises a swirl pump provided with an impeller and the impeller of the swirl pump is accommodated in the pump chamber.

7. An absorption refrigerator according to claim 6, wherein the swirl pump has a housing thereof in which the impeller is rotatably installed and a flow passage for running the refrigerant in the pump chamber is defined by a portion of the housing and a wall of said recessed part in the wall of the refrigerant tank.

8. An absorption refrigerator comprising:

an evaporator provided with a refrigerant tank for storing a refrigerant;

an absorber provided with an absorbent solution tank for storing a solution of an absorbent and arranged for allowing the absorbent solution to absorb a refrigerant vapor generated in the evaporator thus to generate an absorption heat;

a regenerator for heating the absorbent solution drawn from the absorber to release the refrigerant vapor;

a condenser for condensing the refrigerant vapor released in the regenerator for supplying to the evaporator; and a swirl pump for delivering the absorbent solution from the absorbent solution tank; and another swirl pump for delivering the refrigerant from the refrigerant tank, in which a wall of the absorbent solution tank has a recess formed therein for defining a pump chamber together with the absorbent solution tank in which the impeller of the swirl pump for pumping the absorbent solution is accommodated, and a wall of the refrigerant tank has a recess formed therein for defining a pump chamber together with the refrigerant tank in which the impeller of the swirl pump for pumping the refrigerant is accommodated.

* * * * *